S. C. Horton.
Post-Hole Auger.
Nº 86,400.      Patented Feb. 2, 1869.
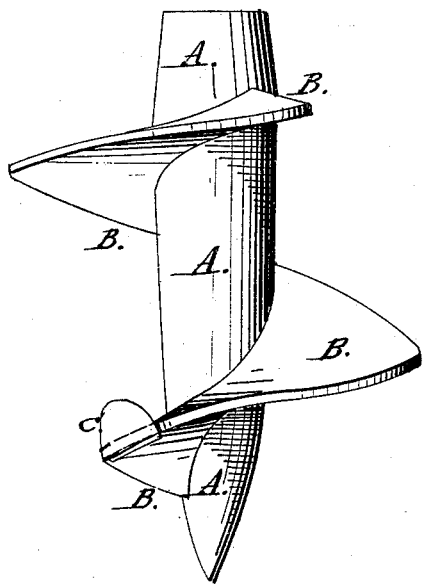
Witnesses:
A. W. Almqvist
Wm. A. Morgan
Inventor:
S. C. Horton
per Munn & Co.
Attorneys

S. C. HORTON, OF TARRYTOWN, NEW YORK.

Letters Patent No. 86,400, dated February 2, 1869.

IMPROVED POST-HOLE AUGER.

The Schedule referred to in these Letters Patent and making part of the same.

*To all whom it may concern:*

Be it known that I, S. C. HORTON, of Tarrytown, Westchester county, New York, have invented a new and improved Post-Hole Digger; and I do hereby declare that the following is a full, clear, and exact description thereof, which will enable others skilled in the art to make and use the same, reference being had to the accompanying drawing, forming part of this specification.

The figure is a side view of my improved post-hole digger.

My invention has for its object to furnish an improved post-hole digger, which shall be simple in construction and effective in operation, doing its work quickly and well; and It consists in the peculiar construction of the same, as will be hereinafter more fully described.

A represents the shank of the digger, the lower end of which is made pointed, as shown in the drawing, to assist it in entering the ground, and to serve as a guide to cause it to pass down vertically into the ground.

The upper end of the shank A is made hollow, to receive the lower end of the shaft, which is secured in place by any of the well-known means for such purposes, and the upper end of which is provided with a cross-head or handle in the ordinary manner.

B is a spiral flange, cast solid upon the shank A, and making about one and a half turn around said shank A.

The pitch of the spiral flange B is made irregular, being steeper in some places than in others, so as to break up the slice being raised by said flange B, and thus to facilitate the raising of said slice from the hole.

This construction and arrangement of the spiral flange B also allows the digger to pass freely through stony ground, the said stones, when not larger than the space between the turns of said flange B, passing up freely.

C is an upwardly-projecting lip or cutter detachably secured to the edge of the lower part of the spiral flange B by rivets, screws, or bolts, so that it may be detached, when desired, to enable it to be sharpened or replaced with a new one.

The lip or cutter C is designed to separate the slice being cut and raised from the mass of the ground, so as to leave the surface of the hole smooth and regular.

The lip C also serves to cut off any roots that may be in the ground, and that would otherwise obstruct the advance or operation of the auger.

Having thus described my invention,

I claim as new, and desire to secure by Letters Patent—

The post-hole digger, constructed as described, of the hollow shank A, pointed at its lower end, and having cast upon it the spiral flange B, of irregular pitch, which carries near its lower end the upwardly-projecting detachable lip C, as herein described, for the purpose specified.

S. C. HORTON.

Witnesses:
G. T. DAVIS,
JAS. AYRES.